(12) United States Patent
Takeda et al.

(10) Patent No.: US 10,706,998 B2
(45) Date of Patent: Jul. 7, 2020

(54) ELECTRICAL STEEL SHEET AND METHOD FOR PRODUCING ELECTRICAL STEEL SHEET

(71) Applicant: NIPPON STEEL & SUMITOMO METAL CORPORATION, Tokyo (JP)

(72) Inventors: Kazutoshi Takeda, Tokyo (JP); Hiroyasu Fujii, Tokyo (JP); Masaru Takahashi, Tokyo (JP); Shuichi Yamazaki, Tokyo (JP); Hiroki Hori, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 186 days.

(21) Appl. No.: 15/550,861

(22) PCT Filed: Feb. 15, 2016

(86) PCT No.: PCT/JP2016/054268
§ 371 (c)(1),
(2) Date: Aug. 14, 2017

(87) PCT Pub. No.: WO2016/136515
PCT Pub. Date: Sep. 1, 2016

(65) Prior Publication Data
US 2018/0033529 A1 Feb. 1, 2018

(30) Foreign Application Priority Data
Feb. 26, 2015 (JP) .................. 2015-036167

(51) Int. Cl.
| | |
|---|---|
| H01F 1/18 | (2006.01) |
| H01F 3/00 | (2006.01) |
| C09D 5/03 | (2006.01) |
| C09D 5/08 | (2006.01) |
| C09D 7/63 | (2018.01) |
| C23C 22/07 | (2006.01) |
| C08K 3/32 | (2006.01) |
| C08K 5/09 | (2006.01) |
| C08K 5/11 | (2006.01) |
| B32B 7/02 | (2019.01) |
| H01B 3/42 | (2006.01) |
| C23C 22/74 | (2006.01) |
| C09D 7/40 | (2018.01) |
| H01B 3/40 | (2006.01) |
| C23C 22/00 | (2006.01) |
| H01B 3/44 | (2006.01) |
| B32B 15/08 | (2006.01) |
| C23C 22/22 | (2006.01) |
| B32B 15/082 | (2006.01) |
| B32B 15/09 | (2006.01) |
| B32B 15/092 | (2006.01) |
| C21D 8/12 | (2006.01) |
| C22C 38/06 | (2006.01) |
| C08K 5/053 | (2006.01) |
| C08K 5/098 | (2006.01) |
| C08K 5/092 | (2006.01) |
| C22C 38/00 | (2006.01) |

(52) U.S. Cl.
CPC ................. *H01F 1/18* (2013.01); *B32B 7/02* (2013.01); *B32B 15/08* (2013.01); *B32B 15/082* (2013.01); *B32B 15/09* (2013.01); *B32B 15/092* (2013.01); *C09D 5/03* (2013.01); *C09D 5/084* (2013.01); *C09D 7/40* (2018.01); *C09D 7/66* (2018.01); *C21D 8/1283* (2013.01); *C23C 22/00* (2013.01); *C23C 22/07* (2013.01); *C23C 22/22* (2013.01); *C23C 22/74* (2013.01); *H01B 3/40* (2013.01); *H01B 3/421* (2013.01); *H01B 3/447* (2013.01); *H01F 3/00* (2013.01); *C08K 5/053* (2013.01); *C08K 5/09* (2013.01); *C08K 5/092* (2013.01); *C08K 5/098* (2013.01); *C08K 5/11* (2013.01); *C08K 2003/321* (2013.01); *C08K 2003/329* (2013.01); *C21D 8/12* (2013.01); *C22C 38/00* (2013.01); *C22C 38/06* (2013.01)

(58) Field of Classification Search
CPC ....... H01F 1/18; C21D 8/1283; B32B 15/082; B32B 15/09; B32B 15/092; C23C 22/07–22/23
See application file for complete search history.

(56) References Cited

U.S. PATENT DOCUMENTS

| 3,477,881 A | 11/1969 | Wada et al. |
| 6,159,534 A | 12/2000 | Takeda |
| 2011/0212335 A1* | 9/2011 | Takeda .................... C22C 38/02 428/458 |

FOREIGN PATENT DOCUMENTS

| CN | 102227515 A | 10/2011 |
| EP | 0 926 249 A1 | 6/1999 |

(Continued)

OTHER PUBLICATIONS

Machine translation of JP 2011-252191 A (Year: 2011).*

(Continued)

*Primary Examiner* — Ramsey Zacharia
(74) *Attorney, Agent, or Firm* — Birch, Stewart, Kolasch & Birch, LLP

(57) ABSTRACT

An electrical steel sheet has an insulation coating on a steel sheet surface. The insulation coating includes: a binder consisting of 100 parts by mass of a metal phosphate and 1 to 50 parts by mass of an organic resin having an average particle size of 0.05 to 0.50 μm; and a carboxylic acid-containing compound with a carbon number of 2 to 50 in an amount of 0.1 to 10.0 parts by mass based on 100 parts by mass of solids content of the binder. The organic resin is at least one selected from the group consisting of acrylic resins, epoxy resins, and polyester resins. The insulation coating of this electrical steel sheet shows good edge corrosion resistance after blanking.

18 Claims, No Drawings

(56) References Cited

FOREIGN PATENT DOCUMENTS

| EP | 2 366 810 A1 | 9/2011 |
|---|---|---|
| JP | 50-015013 | 2/1975 |
| JP | 58-031086 | 2/1983 |
| JP | 61-056287 | 3/1986 |
| JP | 06-330338 | 11/1994 |
| JP | 11-080971 | 3/1999 |
| JP | 11-131250 | 5/1999 |
| JP | 2002-047576 | 2/2002 |
| JP | 2002-317276 | 10/2002 |
| JP | 2008-031245 | 2/2008 |
| JP | 2010-261063 | 11/2010 |
| JP | 2011-252191 | 12/2011 |
| KR | 10-2011-0083687 A | 7/2011 |
| TW | 201029836 | 8/2010 |
| WO | 2010/061722 | 6/2010 |

OTHER PUBLICATIONS

Extended European Search Report dated Sep. 28, 2018 for corresponding European Patent Application No. 16755262.9.
International Preliminary Report on Patentability and English Translation of Written Opinion of the International Searching Authority dated Aug. 29, 2017, for PCT/JP2016/054268 (Forms PCT/IB/373 and PCT/ISA/237).
Indian Office Action for Indian Application No. 201717030998, dated May 20, 2019, with English translation.
Chinese Office Action dated Mar. 22, 2019, for corresponding Chinese Patent Application No. 201680010841.8.
Chinese Office Action and Search Report dated Oct. 16, 2018, for corresponding Chinese Patent Application No. 201680010841.8.
Korean Office Action, dated Nov. 23, 2018, for corresponding Korean Application No. 10-2017-7026277, with English translation.
Indian Hearing Notice dated Feb. 25, 2020, issued in Indian Patent Application No. 201717030998.

* cited by examiner

ELECTRICAL STEEL SHEET AND METHOD FOR PRODUCING ELECTRICAL STEEL SHEET

TECHNICAL FIELD

The present invention relates to an electrical steel sheet and a method for producing the electrical steel sheet.

BACKGROUND ART

In general, when electrical apparatus such as a motor and a transformer is to be produced using an electrical steel sheet, firstly a coiled electrical steel sheet is blanked into a predetermined shape, and the blanked electrical steel sheets are laminated and then fixed to form an iron core. Next, a copper wire is wound around the teeth and others of the iron core, and then the iron core is impregnated with a varnish and the iron core is sprayed with a powder coating composition for example, which is baked and dried. Further, a terminal for copper wire connection, a flange, bearings and others are attached to the dried iron core, and then the iron core is secured to a casing. In this manner, motors, transformers, and others are produced.

Electrical steel sheets are provided with an insulation coating on their surfaces to prevent current flow between the laminated steel sheets so as to reduce iron loss and improve magnetic properties.

Insulation coatings applied to the surface of an electrical steel sheet need to exhibit good insulating properties, and in addition, need to exhibit good coating properties in addition to good insulating properties, such as weldability, smoothness, adhesion, thermal resistance, and coating compatibility, in order to improve working efficiency for working of the electrical steel sheet.

Known examples of insulation coatings of electrical steel sheets include coatings based on an organic resin, coatings based on a salt of an inorganic acid such as a chromate salt or a phosphate salt, and coatings based on a mixture of a salt of an inorganic acid and an organic resin.

In general, insulation coatings based on an organic resin have low thermal resistance and insulation coatings based on a salt of an inorganic acid tend to delaminate from the steel sheet during working, and for this reason, conventionally, coatings based on a mixture of a salt of an inorganic acid and an organic resin are frequently used as insulation coatings.

Examples of technologies related to the insulation coating of an electrical steel sheet are as follows. JP50-15013, an old publication, discloses a technique for forming an insulation coating using a treatment solution based on a bichromate salt and an emulsion of an organic resin such as a vinyl acetate-acrylic resin copolymer, a butadiene-styrene copolymer, or an acrylic resin.

JP 2002-317276 discloses a technique related to an insulation coating composition having improved wettability. The insulation coating composition is formed by mixing a predetermined amount of non-ionic or anionic surfactant having a predetermined HLB (Hydrophile-Lipophile Balance) value with an insulation coating solution containing a phosphate salt and a chromate salt.

In recent years, with increasing awareness of environmental issues, technologies have been developed for forming an insulation coating without using an aqueous solution of hexavalent chromium-containing chromic acid. Such technologies are disclosed, for example in JP06-330338. It discloses a technique in which at least one among a phosphate salt having a specific composition, a boric acid, and colloidal silica is mixed with an emulsion of an organic resin having a specific particle size, at a specific mixing ratio, and the mixture is baked on a steel sheet. This technique uses a treatment solution free of a chromium compound but can achieve good coating properties comparable to those of conventional chromium compound-containing insulation coatings, and in addition, can retain excellent smoothness after stress relief annealing.

Furthermore, developments have also been made for such chromic acid-free insulation coatings for their influence on the workability of the electrical steel sheets. For example, JP11-80971 discloses a technique for improving blankability of an electrical steel sheet by applying and baking, on an electrical steel sheet, a treatment solution based on a metal phosphate and an organic resin and in which the carbon i s peak and the phosphorus 2 s peak have specific intensities as measured by photoemission spectroscopy. JP11-80971 also discloses that blankability of an electrical steel sheet can be further improved by adding a specific amount of aqueous organic compound having a boiling point or sublimation temperature of 100° C. or more to a treatment solution based on a metal phosphate and an organic resin.

JP2002-47576 discloses techniques related to a treatment solution for insulation coatings of electrical steel sheets which contains, at a specific ratio, a monobasic phosphoric acid salt of specific metal ions and a phosphonic acid compound, and a method for treating an electrical steel sheet using the treatment solution for insulation coatings.

JP2008-31245 discloses a technique related to a lubricant composition capable of imparting high corrosion resistance to various types of steel sheets, capable of being readily removed with an alkaline degreasing agent, and capable of being used as a metal working oil.

JP2010-261063 discloses a technique related to a treatment solution for forming insulation coatings of electrical steel sheets. The treatment solution contains a monobasic phosphoric acid salt of a multivalent metal, a chelating agent, a polyamine, and a synthetic resin.

LIST OF PRIOR ART DOCUMENTS

Patent Document

Patent Document 1: JP50-15013
Patent Document 2: JP2002-317276
Patent Document 3: JP06-330338
Patent Document 4: JP11-80971
Patent Document 5: JP2002-47576
Patent Document 6: JP2008-31245
Patent Document 7: JP2010-261063

SUMMARY OF INVENTION

Technical Problem

In recent years, industrialization has progressed in China and South East Asia and many plants have been built for producing motors, transformers, and others. As a result, the amount of electrical steel sheets used in the regions has greatly increased, but the regions are relatively hot and humid, and therefore have the problem of preventing rust of electrical steel sheets.

Specifically, electrical steel sheets are processed in such a manner that blanked electrical steel sheets are laminated to form an iron core, and after the iron core has been fixed with a varnish for example, wire winding and coating is performed thereon. It should be noted that the edges of the blanked electrical steel sheets are exposed base steel portions and therefore are highly prone to rust.

However, when blanking is performed on an electrical steel sheet, blanking oil is used for the process and therefore the blanking oil deposits on the edges of the blanked electrical steel sheet. Thus, usually, the edges of electrical steel sheets are protected from rust by blanking oil, and therefore it is unlikely that the edges after blanking become corroded immediately.

However, in some cases, blanked electrical steel sheets are saved for some time period after the blanking step because of, for example, a difference in step processing ability between the blanking step and the subsequent step. Furthermore, in cases of some motors or transformers, blanked electrical steel sheets may be transferred from one plant to another as well as inside a plant.

Even in such cases, it is necessary that the edge portions of the laminated iron core not be corroded. Thus, electrical steel sheets need to have not only corrosion resistance of the surface of the steel sheet but also improved edge corrosion resistance so to speak.

The insulation coatings disclosed in JP50-15013 and JP2002-317276, mentioned above, contain a chromium compound and therefore are problematic for use because of environmental issues. Furthermore, electrical steel sheets formed using the techniques disclosed in JP06-330338, JP11-80971, JP2002-47576, JP2008-31245, and JP2010-261063, mentioned above, have a problem in that the edge corrosion resistance after blanking are not good.

The present invention has been made in view of the problems described above, and accordingly, an object of the present invention is to provide an electrical steel sheet including an insulation coating having, not only good insulating properties, but also good adhesion, corrosion resistance, appearance, and edge corrosion resistance after blanking, without the use of a chromium compound in the insulation coating.

Solution to Problem

The gist of the present invention is as set forth in the following items (1) to (6).

(1) An electrical steel sheet having an insulation coating on a steel sheet surface, wherein the insulation coating comprises:

a binder consisting of 100 parts by mass of a metal phosphate and 1 to 50 parts by mass of an organic resin having an average particle size of 0.05 to 0.50 μm; and a carboxylic acid-containing compound with a carbon number of 2 to 50 in an amount of 0.1 to 10.0 parts by mass based on 100 parts by mass of solids content of the binder, wherein the organic resin is at least one selected from the group consisting of acrylic resins, epoxy resins, and polyester resins.

(2) The electrical steel sheet according to the item (1), wherein the insulation coating comprises a polyhydric alcohol in an amount of 0.5 to 10 parts by mass based on 100 parts by mass of solids content of the binder.

(3) The electrical steel sheet according to the item (1) or (2), wherein the carboxylic acid-containing compound includes an alkyl group or an alkenyl group, each being linear or branched and having a carbon number of 4 to 20.

(4) A method for producing an electrical steel sheet, including the steps of:

preparing a binder solution by mixing 100 parts by mass of a metal phosphate with an emulsion of an organic resin in an amount of 1 to 50 parts by mass based on solids content of the resin, the organic resin having an average particle size of 0.05 to 0.50 μm;

preparing a treatment solution by mixing, with the binder solution, a carboxylic acid-containing compound with a carbon number of 2 to 50 in an amount of 0.1 to 10.0 parts by mass based on 100 parts by mass of solids content of the binder solution; and applying the treatment solution to a surface of the electrical steel sheet and subjecting the surface to baking and drying, wherein the organic resin is at least one selected from the group consisting of acrylic resins, epoxy resins, and polyester resins.

(5) The method for producing an electrical steel sheet according to the item (4), wherein, in the step of preparing the treatment solution, a polyhydric alcohol is further mixed with the binder solution, the polyhydric alcohol being in an amount of 0.5 to 10 parts by mass based on 100 parts by mass of solids content of the binder solution.

(6) The method for producing an electrical steel sheet according to the item (4) or (5), wherein the carboxylic acid-containing compound includes an alkyl group or an alkenyl group, each being linear or branched and having a carbon number of 4 to 20.

Advantageous Effects of Invention

As described above, in the present invention, an insulation coating is formed on the surface of an electrical steel sheet. The insulation coating contains, at a specific ratio, a metal phosphate, an organic resin having a specific average particle size, and a carboxylic acid-containing compound with a carbon number of 2 to 50. By this means, the present invention provides an electrical steel sheet including an insulation coating that exhibits good edge corrosion resistance after blanking and lamination and also has good adhesion, corrosion resistance, and appearance.

DESCRIPTION OF EMBODIMENTS

A preferred embodiment of the present invention will be described in detail.

The present invention relates to an electrical steel sheet and a method for producing the electrical steel sheet. Specifically, the present invention relates to electrical steel sheets for use as a material for iron cores of electrical apparatus and others, and to methods for producing the electrical steel sheets, and in particular relates to an electrical steel sheet including an insulation coating that exhibits good edge corrosion resistance and is free of chromic acid, and to a method for producing the electrical steel sheet.

An electrical steel sheet according to the present invention is an electrical steel sheet having an insulation coating on the surface. The insulation coating is a coating in which a binder and a carboxylic acid-containing compound are mixed and dispersed. The binder is composed of 100 parts by mass of a metal phosphate and 1 to 50 parts by mass of an organic resin having an average particle size of 0.05 to 0.50 μm, and the carboxylic acid-containing compound has a carbon number of 2 to 50 and is contained in an amount of 0.1 to 10.0 parts by mass based on 100 parts by mass of solids content of the binder.

Firstly, the following description is given of an electrical steel sheet on which the insulation coating is to be formed in the present embodiment.

In the present embodiment, a suitable example of the electrical steel sheet on which the insulation coating is formed may be a non-oriented electrical steel sheet that at least contains, by mass %, Si: 0.1% or more, Al: 0.05% or more, and Mn: 0.01% or more, with balance Fe and impurities. Si, Al, and Mn increase the electrical resistance of the electrical steel sheet and improve its magnetic properties with the increase in their contents, but they decrease the workability. For this reason, preferably, the Si content is less than 4.0% by mass, the Al content is less than 3.0% by mass, and the Mn content is 2.0% by mass. The contents of other optional elements, such as S, N, and C, that may be added, are preferably less than 100 ppm each, and more preferably less than 20 ppm each.

An electrical steel sheet for use in the present embodiment may be formed, for example, by heating a slab having the steel composition described above to 1150 to 1250° C., hot-rolling the slab and winding it into a coil, annealing as necessary the sheet in the as-hot-rolled condition within a temperature range of 800° C. to 1050° C., thereafter cold rolling the sheet to approximately 0.15 to 0.5 mm, and further annealing the sheet at 750 to 1100° C.

The surface of the electrical steel sheet, on which the insulation coating is to be formed, may be subjected to an optional pretreatment prior to application of a treatment solution described below. Examples of the pretreatment include degreasing treatments using an alkali or others and pickling treatments using a hydrochloric acid, a sulfuric acid, a phosphoric acid, or others. The surface of the electrical steel sheet, prior to application of the treatment solution described below, may not be subjected to any of such pretreatments but may be the surface in the as-finish-annealed condition.

Furthermore, in the present embodiment, the electrical steel sheet, on which the insulation coating is to be formed, preferably has a surface roughness (Ra) of not more than 1.0 µm, and more preferably a surface roughness (Ra) of 0.1 µm or more and 0.5 µm or less. If the Ra is less than 0.1 µm, the cost of the cold rolling process tends to be high, and if the Ra is more than 1.0 µm, the space factor decreases. Thus, the Ra of less than 0.1 µm and more than 1.0 µm is not preferred. The surface roughness (Ra) of the electrical steel sheet can be measured in accordance with a JIS method (JIS B0601).

Next, the following description is given of the insulation coating to be formed on the surface of the electrical steel sheet in the present embodiment.

In the present embodiment, the metal phosphate contained in the insulation coating refers to solid content of an aqueous solution containing phosphoric acid and metal ions as base components, and functions as a binder in the insulation coating. As the type of phosphoric acid to be included in the metal phosphate, orthophosphoric acid, metaphosphoric acid, and polyphosphoric acid, for example, are preferred but are not limited to. There are no particular limitations on the type of metal ions to be included in the metal phosphate, but Al, Mg, Ca, Co, Li, Mn, Ni, Sr, Ti, and Zn, for example, are preferred, and in particular Al, Mg, and Zn are more preferred. Preparation of a solution of the metal phosphate is preferably carried out, for example, by mixing an oxide, a carbonate, or a hydroxide of the above-mentioned metal ions with a phosphoric acid such as orthophosphoric acid and preparing the solution.

The metal phosphate may be used as a single phosphate or as a mixture of two or more phosphates. The metal phosphate may be used alone, or phosphoric acid or boric acid, for example, may further be added.

In the present embodiment, the organic resin contained in the insulation coating functions as a binder in the insulation coating. The organic resin is at least one selected from the group consisting of acrylic resins, epoxy resins, and polyester resins. These organic resins are commercially available and can be readily procured. Emulsions of the resins can also be procured similarly.

The acrylic resin may be a resin formed from a monomer such as methyl acrylate, ethyl acrylate, n-butyl acrylate, i-butyl acrylate, n-octyl acrylate, i-octyl acrylate, 2-ethylhexyl acrylate, n-nonyl acrylate, n-decyl acrylate, or n-dodecyl acrylate, or more suitably may be a resin formed by copolymerizing the monomer with a functional group-containing monomer such as acrylic acid, methacrylic acid, maleic acid, maleic anhydride, fumaric acid, crotonic acid, or itaconic acid or with a hydroxyl group-containing monomer such as 2-hydroxyethyl (meth)acrylate, 2-hydroxypropyl (meth)acrylate, 3-hydroxybutyl (meth)acrylate, or 2-hydroxyethyl (meth)allyl ether.

The epoxy resin may be a resin formed by, for example, reacting an amine-modified epoxy resin with a carboxylic acid anhydride. Specifically, the epoxy resin may suitably be a resin formed by modifying an epoxy resin of, for example, bisphenol A diglycidyl ether, a ring-opened caprolactone adduct of bisphenol A diglycidyl ether, bisphenol F diglycidyl ether, bisphenol S diglycidyl ether, novolac glycidyl ether, or dimer acid glycidyl ether, with an amine such as isopropanolamine, monopropanolamine, monobutanolamine, monoethanolamine, diethylenetriamine, ethylenediamine, butalamine, propylamine, isophoronediamine, tetrahydrofurfurylamine, xylenediamine, hexylamine, nonylamine, triethylenetetramine, tetramethylenepentamine, and diaminodiphenyl sulfone, and reacting the modified resin with a carboxylic acid anhydride such as succinic anhydride, itaconic anhydride, maleic anhydride, citraconic anhydride, phthalic anhydride, and trimellitic anhydride.

The polyester resin may suitably be a polyester resin formed by reacting a dicarboxylic acid with a glycol. Examples of the dicarboxylic acid include terephthalic acid, isophthalic acid, orthophthalic acid, naphthalene dicarboxylic acid, biphenyl dicarboxylic acid, succinic acid, adipic acid, sebacic acid, fumaric acid, maleic acid, maleic anhydride, itaconic acid, and citraconic acid, and examples of the glycol include ethylene glycol, 1,2-propylenglycol, 1,3-propanediol, 1,4-butanediol, 1,5-pentanediol, neopentyldiol, 1,6-hexanediol, triethylene glycol, dipropylene glycol, and polyethylene glycol. Furthermore, the polyester resins described above may be graft polymerized with, for example, acrylic acid, methacrylic acid, maleic acid, fumaric acid, itaconic acid, citraconic acid, or methacrylic anhydride, and the resultant resins may be used.

The organic resins mentioned above may be emulsions or water soluble resins. In the case where the organic resin is an emulsion, the organic resin may be one of, or a mixture of two or more of the organic resins mentioned above. Furthermore, in the case where the organic resin is an emulsion, the average particle size of the organic resin preferably ranges from 0.05 to 0.50 µm. If the average particle size of the organic resin is less than 0.05 µm, the organic resin tends to agglomerate in the treatment solution and this reduces the uniformity of the insulation coating. Furthermore, if the average particle size of the organic resin is more than 0.50 µm, the stability of the solution decreases. Furthermore, in the case where the organic resin is an emulsion, the average particle size of the organic resin is preferably not less than 0.10 µm and not more than 0.30 µm.

The average particle size of the organic resin is a number average of the diameters of the primary particles of the organic resin provided that the particle shapes approximate spheres (i.e., number average particle size of the primary particles of the organic resin), and it can be measured, for example, by the laser diffraction light scattering method (method in accordance with (JIS Z8825-1).

The mixing ratio of the metal phosphate and the organic resin is 100 parts by mass of the metal phosphate and 1 to 50 parts by mass in total of the organic resin. If the mixing ratio of the organic resin is less than 1 part by mass, the concentration of the organic resin is extremely low and therefore agglomeration likely occurs, with the result that the stability of the coating solution decreases. If the mixing ratio of the organic resin is more than 50 parts by mass, the formed insulation coating will have reduced thermal resistance and therefore such a mixing ratio is not appropriate.

The metal phosphate and the organic resin function as a binder of the insulation coating. The thickness of the insulation coating preferably ranges from about 0.3 to about 5.0 μm, and more preferably ranges from 0.5 to 2.0 μm.

In the present embodiment, the carboxylic acid-containing compound with a carbon number of 2 to 50, contained in the insulation coating, is used as a rust-preventive component and contained in the binder. The carboxylic acid-containing compound mentioned above refers to a carboxylic acid compound containing at least one carboxy group, a carboxylic acid salt compound, i.e., a salt of the carboxylic acid compound and a metal, or a mixture of the carboxylic acid compound and the carboxylic acid salt compound. When an electrical steel sheet has been blanked, these components readily dissolve in the blanking oil, and as a result, the corrosion resistance of the blanking oil deposited on the edges of the blanked electrical steel sheet can be improved. Accordingly, the present invention achieves improved edge corrosion resistance of post-blanking electrical steel sheets.

Examples of the carboxylic acid compound with a carbon number of 2 to 50 include monocarboxylic acids, examples of which include straight chain fatty acids such as lauric acid and stearic acid, saturated carboxylic acids having a naphthene nucleus, and aromatic carboxylic acid derivatives such as benzoic acid. Also, the examples include dicarboxylic acids, examples of which include succinic acid, succinic acid derivatives such as alkyl succinic acid, half esters of alkyl succinic acid, alkenyl succinic acid, half esters of alkenyl succinic acid, and succinimide, hydroxy fatty acids, mercapto fatty acids, sarcosine derivatives, aromatic carboxylic acid derivatives such as phthalic acid, and oxidized waxes such as oxides of wax or petrolatum.

Examples of the carboxylic acid salt compound with a carbon number of 2 to 50 include salts of the carboxylic acid compounds mentioned above and metals. Examples of the metals include cobalt, manganese, zinc, aluminum, calcium, barium, lithium, magnesium, and copper.

The carboxylic acid-containing compound has a carbon number of 2 to 50. The compound having a carbon number of less than 2, i.e., formic acid, which has a carbon number of 1, and its salts are highly volatile, and therefore its inclusion is unlikely to produce any advantageous effects, and moreover they are toxic. On the other hand, if a carboxylic acid-containing compound having a carbon number of more than 50 is used, because of its high viscosity, the coating spreads to the edges to a less extent, and as a result, the rust-preventive effect decreases. The carboxylic acid-containing compound preferably has a carbon number of 5 or more and 30 or less.

The carboxylic acid-containing compound preferably includes an alkyl group or an alkenyl group, each being linear or branched and having a carbon number of 4 to 20, and more preferably includes a linear alkyl group or a linear alkenyl group, each having a carbon number of 8 to 14. Examples of the carboxylic acid-containing compound including an alkyl group or an alkenyl group, each being linear or branched and having a carbon number of 4 to 20, include alkyl succinic acid, half esters of alkyl succinic acid, alkenyl succinic acid, half esters of alkenyl succinic acid, alkyl benzoic acid, alkenyl benzoic acid, alkyl salicylic acid, alkenyl salicylic acid, alkyl phthalic acid, alkenyl phthalic acid, and salts of the foregoing.

The content of the carboxylic acid-containing compound ranges from 0.1 to 10.0 parts by mass based on 100 parts by mass of solids content of the binder. If the content is less than 0.1 parts by mass, the effect of the rust-preventive component cannot be obtained. On the other hand, if the content is more than 10.0 parts by mass, stickiness occurs. Furthermore, the content of the mixture of such rust-preventive components is preferably 0.3 parts by mass or more and 3.0 parts by mass or less based on 100 parts by mass of solids content of the binder.

In the present embodiment, for addition of the carboxylic acid-containing compound to the coating solution, the carboxylic acid-containing compound may be emulsified using one or more surfactants before being mixed with the coating solution. Suitable examples of the surfactants that may be used for emulsification of the carboxylic acid-containing compound include, but not limited to, nonionic surfactants, and specifically, more suitable examples thereof include polyoxyethylene alkyl ethers, polyoxyethylene alkylphenyl ethers, and polyoxyethylene alkyl esters.

In addition, in the present invention, a phosphonic acid compound may be added to the insulation coating as necessary to improve the corrosion resistance and appearance. Suitable examples of the phosphonic acid compound include phosphonic acid, salts of phosphonic acid, aminotrimethylenephosphonie acid, salts of aminotrimethylenephosphonic acid, hydroxyethane phosphonic acid, salts of hydroxyethane phosphonic acid, and derivatives of the foregoing, and in particular, more suitable examples include 1-hydroxyethylidene-1,1-diphosphonic acid.

The content of the phosphonic acid compound preferably ranges from 5 to 50 parts by mass based on 100 parts by mass of solids content of the metal phosphate. If the content of the phosphonic acid compound is less than 5 parts by mass, no effect by the inclusion is observed, and therefore such a content is not preferred. On the other hand, if the content of the phosphonic acid compound is more than 50 parts by mass, stickiness occurs, and therefore such a content is not preferred. Furthermore, the content of the phosphonic acid compound is more preferably 8 parts by mass or more and 25 parts by mass or less based on 100 parts by mass of solids content of the metal phosphate.

Furthermore, in the present invention, a polyhydric alcohol may be added to the insulation coating. The polyhydric alcohol used in the present invention includes polyhydric alcohols that contain two or more hydroxyl groups per molecule and can sufficiently dissolve in the coating solution for the insulation coating according to the present invention. Specific examples of the polyhydric alcohols include diethylene glycol, triethylene glycol, tetraethylene glycol, propylene glycol, 1,4-butylene glycol, 2,3-butylene glycol, 2-methyl-2,4-pentanediol, 2-ethyl-2,4-hexanediol, and glycerine.

The content of the polyhydric alcohol in the insulation coating preferably ranges from 0.5 to 10 parts by mass based on 100 parts by mass of solids content of the metal phosphate. If the content of the polyhydric alcohol is less than 0.5 parts by mass, the appearance of the electrical steel sheet after having been formed with the insulation coating is not good, and therefore such a content is not preferred. On the other hand, if the content of the polyhydric alcohol is more than 10 parts by mass, stickiness occurs, and therefore such a content is not preferred. Furthermore, the content of the polyhydric alcohol is more preferably 1 parts by mass or more and 5 parts by mass or less based on 100 parts by mass of solids content of the metal phosphate.

Furthermore, in the present invention, in order to improve scratch resistance and others, a water soluble inorganic compound such as silicate and alumina sol may be used by being mixed with the coating solution for forming the insulation coating, and further, a surface tension reducing agent including a surfactant or others of various types may be mixed and used. Furthermore, examples of materials that may be further used by being added to the coating solution for forming the insulation coating include color pigments or body pigments such as titanium oxide and calcium carbonate, rust-preventive agents such as zinc phosphate and calcium phosphate, thickeners, dispersants, film forming agents, antifoam agents, organic solvents, and preservatives.

In the present embodiment, the electrical steel sheet having the insulation coating on the surface can be produced by applying the coating solution, which contains the components described above mixed therewith, to an electrical steel sheet having the composition described above and then subjecting it to heating, baking, and drying.

There are no particular limitations on the coating method for application of the coating solution to the surface of the electrical steel sheet. For example, a roll coater method may be used to apply the coating solution to the surface of the electrical steel sheet, or a coating method such as a spray method or a dip method may be used to apply the coating solution to the surface of the electrical steel sheet.

Also, there are no particular limitations on the heating method for baking and drying the coating solution, and it is possible to use a common radiation furnace or air heating furnace for example, or to use a method using electrical heating such as an induction heating method.

As for the conditions for baking and drying the coating solution, the heating temperature is preferably within a range of 150 to 400° C. and the baking time preferably ranges from 5 to 30 seconds, for example. More preferably, the heating temperature ranges from 260 to 380° C. If the heating temperature is less than 150° C., moisture may remain in the insulation coating after baking, and therefore such a heating temperature is not preferred. On the other hand, if the heating temperature is more than 400° C., the added organic resin may become oxidized, and therefore such a temperature is not preferred. Furthermore, if the baking time is less than 5 seconds, the baking may be non-uniform, and therefore such a baking time is not preferred. On the other hand, if the baking time is more than 30 seconds, the added rust-preventive agent may remain in the insulation coating in a reduced amount, and therefore such a baking time is not preferred.

EXAMPLE

Firstly, a non-oriented electrical steel sheet was prepared which contained, by mass, Si: 3.0%, Al: 0.8%, Mn: 0.5%, and balance Fe and impurities. The steel sheet had a sheet thickness of 0.30 mm and a surface roughness Ra (arithmetical mean deviation of profile) of 0.28 μm.

Next, aqueous solutions of metal phosphates were prepared by dissolving orthophosphoric acid and a hydroxide, an oxide, or a carbonate of metals, e.g., $Al(OH)_3$ and $Mg(OH)_2$ in water so as to obtain a metal phosphate concentration of 40% by mass, and performing mixing and stirring.

Subsequently, the following 6 types of organic resins emulsion were synthesized to obtain a 30% by mass emulsion solution for each of them. In addition, for comparison, a commercially available urethane resin and polyethylene resin were prepared to obtain a 30% by mass emulsion solution for each of them. Then, the aqueous solutions of the metal phosphates and the 30% by mass emulsion solutions of the organic resins were mixed with each other at the ratios shown in Table 1, so as to prepare binder treatment solutions having the compositions shown in Table 1.

The binder treatment solution No. 11 shown in Table 1 was prepared by mixing an aqueous solution of magnesium chromate and the 30% by mass emulsion solution of Acrylic Resin 3 with each other. The aqueous solution of magnesium chromate was prepared by dissolving chromic anhydride in a predetermined amount of pure water, and then slowly dissolving an equivalent amount of magnesium oxide therein by stirring.

(1) Acrylic Resin 1

Acrylic Resin 1 was synthesized by copolymerizing 40% by mass of methyl methacrylate, 30% by mass of a styrene monomer, 10% by mass of 2-hydroxyethyl methacrylate, and 20% by mass of ethylene glycol methacrylate.

(2) Acrylic Resin 2

Acrylic Resin 2 was synthesized by copolymerizing 20% by mass of methyl acrylate, 30% by mass of a styrene monomer, 25% by mass of isobutyl acrylate, 20% by mass of 4-hydroxybutyl acrylate, and 5% by mass of ethylene glycol dimethacrylate.

(3) Acrylic Resin 3

Acrylic Resin 3 was synthesized by copolymerizing 40% by mass of methyl acrylate, 40% by mass of ethyl acrylate, and 20% by mass of a styrene monomer.

(4) Acrylic Resin 4

Acrylic Resin 4 was synthesized by copolymerizing 40% by mass of acrylate, 40% by mass of dimethylacrylate, and 20% by mass of a styrene monomer.

(5) Epoxy Resin (Carboxyl Group-Containing Epoxy Resin)

A carboxyl group-containing epoxy resin was synthesized by modifying a bisphenol A epoxy resin with monoethanolamine and then graft polymerizing it with succinic anhydride.

(6) Polyester Resin (Carboxyl Group-Containing Polyester Resin)

A carboxyl group-containing polyester resin was synthesized by copolymerizing 40% by mass of dimethyl terephthalate and 40% by mass of neopentyl glycol and then graft polymerizing the copolymer with 10% by mass of fumaric acid and 10% by mass of trimellitic anhydride.

TABLE 1

| Binder treatment solution No. | Metal phosphates or metal chromates Name | Ratio [part by mass] | Organic resin Name | Ratio [part by mass] | Additive Name | Ratio [part by mass] |
|---|---|---|---|---|---|---|
| 1 | Aluminum phosphate | 100 | Acrylic Resin 1 | 30 | Phosphonic acid | 8 |
|   |                    |     |                 |    | Glycerine       | 1 |
| 2 | Aluminum phosphate | 50  | Acrylic Resin 2 | 20 | Phosphonic acid | 23 |
|   | Zinc phosphate     | 50  |                 |    |                 |    |
| 3 | Aluminum phosphate | 70  | Epoxy Resin     | 5  | Ethylene glycol | 4 |
|   | Calcium phosphate  | 30  |                 |    |                 |    |
| 4 | Nickel phosphate   | 100 | Polyester Resin | 45 | —               | — |
| 5 | Aluminum phosphate | 50  | Acrylic Resin 2 | 10 | —               | — |
|   | Magnesium phosphate| 50  |                 |    |                 |    |
| 6 | Aluminum phosphate | 100 | Acrylic Resin 4 | 15 | —               | — |
| 7 | Aluminum phosphate | 100 | Acrylic Resin 1 | 56 | —               | — |
| 8 | Aluminum phosphate | 50  | Acrylic Resin 1 | 0.7| —               | — |
|   | Magnesium phosphate| 50  |                 |    |                 |    |
| 9 | Aluminum phosphate | 100 | Urethane Resin  | 30 | —               | — |
| 10| Aluminum phosphate | 100 | Polyethylene Resin | 15 | —            | — |
| 11| Magnesium chromate | 100 | Acrylic Resin 3 | 30 | —               | — |

In table 1, the symbol "-" indicates that no additive was included. The ratios in Table 1 are ratios based on the solids content.

Measurements were made by the laser diffraction light scattering method, and it was found that Acrylic Resin 1 had an average particle size of 0.15 μm, Acrylic Resin 2 had an average particle size of 0.14 μm, Acrylic Resin 3 had an average particle size of 0.16 μm, Acrylic Resin 4 had an average particle size of 0.35 μm, Epoxy Resin had an average particle size of 0.20 μm, and Polyester Resin had an average particle size of 0.11 μm.

Furthermore, rust-preventive agents containing carboxylic acid-containing compounds shown in Table 2 or a different rust-preventive agent were added, in predetermined amounts, to the binder treatment solutions shown in Table 1 to prepare coating solutions.

TABLE 2

| Coating solution No. | Binder treatment solution No. | Rust-preventive agent Type | Number of carbon | Content [part by mass] |
|---|---|---|---|---|
| 1  | 1  | Alkenyl succinic acid                                    | 18 | 1.2  |
| 2  | 2  | Lithium salt of hydroxy fatty acid                       | 24 | 2.5  |
| 3  | 2  | Half esters of alkyl succinic acid                       | 20 | 0.8  |
| 4  | 3  | Alkyl succinic acid                                      | 34 | 0.5  |
| 5  | 4  | Calcium salt of alkenyl succinic acid                    | 30 | 8.6  |
| 6  | 5  | Alkyl benzoic acid                                       | 42 | 1.2  |
| 7  | 6  | Magnesium salt of alkyl naphthene acid                   | 20 | 1.5  |
| 8  | 7  | Calcium salt of alkenyl succinic acid                    | 30 | 0.6  |
| 9  | 8  | Calcium salt of alkenyl succinic acid                    | 30 | 0.6  |
| 10 | 1  | Half esters of alkyl succinic acid                       | 20 | 10.4 |
| 11 | 1  | Half esters of alkyl succinic acid                       | 20 | 0.03 |
| 12 | 1  | ethylenediamine tetraacetic acid-containing rust-preventive agent | — | 1.4 |
| 13 | 9  | Alkyl succinic acid                                      | 34 | 0.6  |
| 14 | 10 | Alkyl succinic acid                                      | 34 | 0.6  |
| 15 | 4  | Alkyl succinic acid                                      | 80 | 0.6  |
| 16 | 2  | —                                                        | —  | —    |
| 17 | 11 | —                                                        | —  | —    |

A roll coater method was employed for the application of the treatment solution to the surface of the electrical steel sheet, and the amount of roll pressure and others were adjusted so as to obtain a binder film thickness of approximately 0.5 μm. Drying was performed using an air heating furnace to accomplish baking and drying. Obtained results of the measurements and evaluations in Examples and Comparative Example are shown in Table 3.

The method for evaluating the examples and the comparative examples, which were produced as described above, will be described in detail below.

The insulating properties were evaluated as follows based on interlaminar insulation resistances measured in accordance with a JIS method (JIS C2550): less than 3 Ω·cm$^2$/sheet as "x"; 3Ω or more·cm$^2$/sheet and less than 10 Ω·cm$^2$/sheet as "Δ"; 10Ω or more·cm$^2$/sheet and less than 30 Ω·cm$^2$/sheet as "○"; and 30 or more Ω·cm$^2$/sheet as "⊙". As for the insulating properties, samples evaluated as "⊙" or "○" were determined to be acceptable.

As for the adhesion, each steel sheet sample, with an adhesive tape attached thereto, was wound around metal bars of 10 mm, 20 mm, and 30 mm in diameter and then the adhesive tape was peeled off from each steel sheet sample, and evaluations were made based on the occurrence of delamination in the insulation coatings. Samples that did not have delamination in the insulation coating at the curvature of 10 mm ϕ were evaluated as "10 mm ϕ OK", samples that did not have delamination in the insulation coating at the curvature of 20 mm ϕ were evaluated as "20 mm ϕ OK", samples that did not have delamination in the insulation coating at the curvature of 30 mm ɸ were evaluated as "30 mm ɸ OK", and samples that had delamination in the insulation coating at the curvature of 30 mm ɸ were evaluated as "30 mm ɸ OUT". As for the adhesion, samples evaluated as "10 mm ɸ OK", "20 mm ɸ OK", or "30 mm ɸ OK" were determined to be acceptable.

Corrosion resistance was tested in accordance with the JIS salt spray test (JIS Z2371), and 10-point evaluations were made on the samples after a time lapse of 4 hours. The evaluation criteria are as follows. As for the corrosion resistance, samples evaluated as 7 or higher were determined to be acceptable.

10: No rust forming
9: Very slight rust forming (area fraction of not more than 0.1%)
8: Area fraction of rust=more than 0.1% and not more than 0.25%
7: Area fraction of rust=more than 0.25% and not more than 0.50%
6: Area fraction of rust=more than 0.50% and not more than 1%
5: Area fraction of rust=more than 1% and not more than 2.5%
4: Area fraction of rust=more than 2.5% and not more than 5%
3: Area fraction of rust=more than 5% and not more than 10%
2: Area fraction of rust=more than 10% and not more than 25%
1: Area fraction of rust=more than 25% and not more than 50%

As for the edge corrosion resistance, each electrical steel sheet coated with an insulation coating was blanked using a blanking machine with 10% clearance without feeding oil, and the edges resulting from the blanking were aligned to form an evaluation surface to be evaluated. The blanked electrical steel sheets were held in a temperature and humidity chamber at a temperature of 50° C. and a moisture content of 90% over 48 hours, and thereafter the area fractions of rust in the evaluation surfaces were evaluated in the same manner as that for the corrosion resistance. The evaluation criteria are as follows. As for the edge corrosion resistance, samples evaluated as "7" or higher were determined to be acceptable.

10: No rust forming
9: Very slight rust forming (area fraction of not more than 0.1%)
8: Area fraction of rust=more than 0.1% and not more than 0.25%
7: Area fraction of rust=more than 0.25% and not more than 0.50%
6: Area fraction of rust=more than 0.50% and not more than 1%
5: Area fraction of rust=more than 1% and not more than 2.5%
4: Area fraction of rust=more than 2.5% and not more than 5%
3: Area fraction of rust=more than 5% and not more than 10%
2: Area fraction of rust=more than 10% and not more than 25%
1: Area fraction of rust=more than 25% and not more than 50%

Based on the appearance, the uniformity of the thickness of the insulation coating was evaluated. Samples whose insulation coating was glossy, smooth, and uniform were evaluated as "5", samples whose insulation coating was glossy but slightly less uniform were evaluated as "4", samples whose insulation coating was somewhat glossy and smooth but less uniform were evaluated as "3", samples whose insulation coating was less glossy, somewhat less smooth, and less uniform were evaluated as "2", and samples whose insulation coating was less glossy, less uniform, and less smooth were evaluated as "1". As for the appearance, samples evaluated as "4" or higher were determined to be acceptable.

The space factors were measured in accordance with a JIS method (JIS C2550). As for the space factor, samples having 99.4% or more were determined to be acceptable.

The above results of evaluations of the electrical steel sheets are summarized in Table 3.

TABLE 3

| No. | Coating solution No. | Insulating properties | Adhesion | Corrosion resistance | Edge corrosion resistance | Appearance | Space factor |
|---|---|---|---|---|---|---|---|
| Inventive Example 1 | 1 | ⊙ | 20 mm ɸ OK | 10 | 9 | 5 | 99.5 |
| Inventive Example 2 | 2 | ⊙ | 20 mm ɸ OK | 10 | 10 | 4 | 99.5 |
| Inventive Example 3 | 3 | ○ | 20 mm ɸ OK | 9 | 9 | 5 | 99.4 |
| Inventive Example 4 | 4 | ○ | 20 mm ɸ OK | 10 | 8 | 4 | 99.4 |
| Inventive Example 5 | 5 | ⊙ | 20 mm ɸ OK | 7 | 7 | 5 | 99.5 |
| Inventive Example 6 | 6 | ○ | 20 mm ɸ OK | 9 | 10 | 4 | 99.4 |
| Inventive Example 7 | 7 | ○ | 20 mm ɸ OK | 8 | 7 | 4 | 99.4 |
| Comparative Example 1 | 8 | ○ | 20 mm ɸ OK | 7 | 4 | 5 | 99.4 |
| Comparative Example 2 | 9 | ○ | 20 mm ɸ OK | 8 | 5 | 4 | 99.4 |
| Comparative Example 3 | 10 | ⊙ | 30 mm ɸ OUT | 8 | 7 | 3 | 99.3 |
| Comparative Example 4 | 11 | ○ | 20 mm ɸ OK | 9 | 3 | 5 | 99.4 |
| Comparative Example 5 | 12 | ○ | 30 mm ɸ OK | 7 | 4 | 4 | 99.5 |
| Comparative Example 6 | 13 | ⊙ | 20 mm ɸ OK | 7 | 6 | 3 | 99.4 |
| Comparative Example 7 | 14 | ○ | 30 mm ɸ OK | 8 | 6 | 3 | 99.4 |
| Comparative Example 8 | 15 | Δ | 20 mm ɸ OK | 7 | 7 | 3 | 99.3 |
| Comparative Example 9 | 16 | ○ | 20 mm ɸ OK | 7 | 3 | 5 | 99.5 |
| Reference Example | 17 | ○ | 20 mm ɸ OK | 10 | 10 | 5 | 99.5 |

Reference to the results shown in Table 3 clarifies the advantageous effects of the present invention.

The results in Table 3 demonstrate that Examples 1 to 7 of the present invention have good edge corrosion resistance, with the low degrees of rust forming after blanking. It is also seen that Examples 1 to 7 of the present invention have good properties in all the categories of insulating properties, adhesion, corrosion resistance, appearance, and space factor. Specifically, it is seen that Examples 1 to 7 have insulating properties, adhesion, corrosion resistance, edge corrosion resistance, appearance, and space factor that are approximately comparable to those of Reference Example, which includes the chromium compound-containing insulation coating.

On the other hand, it is seen that Comparative Examples 1 to 9 have lower properties than those of Examples 1 to 7 of the present invention, in terms of at least one among insulating properties, adhesion, corrosion resistance, edge corrosion resistance, appearance, and space factor. Specifically, Comparative Examples 1 and 2, each of which contain the organic resin in an amount outside the range of the present invention, have lower edge corrosion resistance. Comparative Example 3, which contains a rust-preventive agent in an amount greater than the range of the present invention, have a lower adhesion and a lower space factor, and have poorer appearance. Comparative Example 4, which contains a rust-preventive agent in an amount less than the range of the present invention, have lower edge corrosion resistance, and Comparative Example 9, which does not contain a rust-preventive agent, have lower edge corrosion resistance. Comparative Example 5, which contains a rust-preventive agent of a type different from the types of rust-preventive agents specified by the present invention, have lower edge corrosion resistance, and Comparative Examples 6 and 7, each of which contains an organic resin of a type different from the types of organic resins specified by the present invention, have lower edge corrosion resistance and also have poorer appearance. Comparative Example 8, which contains a rust-preventive agent having a carbon number of more than 50, have lower insulating properties and a lower space factor, and also have poorer appearance.

As described above, the electrical steel sheets according to embodiments of the present invention have excellent edge corrosion resistance and have improved insulating properties, adhesion, corrosion resistance, appearance, and space factor, and consequently provide improved efficiency for motor and transformer production.

In the foregoing description, a preferred embodiment of the present invention has been described in detail, but the present invention is not limited to such examples. It will be apparent that those having general knowledge in the field to which the present invention belongs may find various alternations and modifications within the scope of the technical ideas described in the appended claims, and it should be understood that they will naturally come under the technical scope of the present invention.

What is claimed is:

1. An electrical steel sheet having an insulation coating on a steel sheet surface, wherein the insulation coating comprises:
   a binder consisting of 100 parts by mass of a metal phosphate and 1 to 50 parts by mass of an organic resin having an average particle size of 0.05 to 0.50 μm; and
   a carboxylic acid-containing compound with a carbon number of 2 to 50 in an amount of 0.1 to 10.0 parts by mass based on 100 parts by mass of solids content of the binder, wherein
   the carboxylic acid-containing compound being other than a straight chain fatty acid, and
   the organic resin is at least one selected from the group consisting of acrylic resins, epoxy resins, and polyester resins.

2. The electrical steel sheet according to claim 1, wherein the insulation coating comprises a polyhydric alcohol in an amount of 0.5 to 10 parts by mass based on 100 parts by mass of solids content of the binder.

3. The electrical steel sheet according to claim 2, wherein the carboxylic acid-containing compound includes an alkyl group or an alkenyl group, each being linear or branched and having a carbon number of 4 to 20.

4. The electrical steel sheet according to claim 1, wherein the carboxylic acid-containing compound includes an alkyl group or an alkenyl group, each being linear or branched and having a carbon number of 4 to 20.

5. The electrical steel sheet according to claim 1, wherein the carboxylic acid-containing compound is a monocarboxylic acid other than a straight chain fatty acid.

6. The electrical steel sheet according to claim 1, wherein the carboxylic acid-containing compound is one selected from saturated carboxylic acids having a naphthene nucleus, aromatic carboxylic acid derivatives, and benzoic acid.

7. The electrical steel sheet according to claim 1, wherein the carboxylic acid-containing compound is a dicarboxylic acid.

8. The electrical steel sheet according to claim 1, wherein the carboxylic acid-containing compound is one selected from succinic acid, succinic acid derivatives, sarcosine derivatives, aromatic carboxylic acid derivatives, and oxidized waxes.

9. The electrical steel sheet according to claim 1, wherein the carboxylic acid-containing compound is one selected from succinic acid, alkyl succinic acid, half esters of alkyl succinic acid, alkenyl succinic acid, half esters of alkenyl succinic acid, succinimide, sarcosine derivatives, phthalic acid, and oxides of wax or petrolatum.

10. A method for producing an electrical steel sheet according to claim 1, including the steps of:
    preparing a binder solution by mixing 100 parts by mass of a metal phosphate with an emulsion of an organic resin in an amount of 1 to 50 parts by mass based on solids content of the resin, the organic resin having an average particle size of 0.05 to 0.50 μm;
    preparing a treatment solution by mixing, with the binder solution, a carboxylic acid-containing compound with a carbon number of 2 to 50 in an amount of 0.1 to 10.0 parts by mass based on 100 parts by mass of solids content of the binder solution; and
    applying the treatment solution to a surface of the electrical steel sheet and subjecting the surface to baking and drying, wherein
    the carboxylic acid-containing compound being other than a straight chain fatty acid, and
    the organic resin is at least one selected from the group consisting of acrylic resins, epoxy resins, and polyester resins.

11. The method for producing an electrical steel sheet according to claim 10, wherein, in the step of preparing the treatment solution, a polyhydric alcohol is further mixed with the binder solution, the polyhydric alcohol being in an amount of 0.5 to 10 parts by mass based on 100 parts by mass of solids content of the binder solution.

12. The method for producing an electrical steel sheet according to claim 11, wherein the carboxylic acid-containing compound includes an alkyl group or an alkenyl group, each being linear or branched and having a carbon number of 4 to 20.

13. The method for producing an electrical steel sheet according to claim 10, wherein the carboxylic acid-containing compound includes an alkyl group or an alkenyl group, each being linear or branched and having a carbon number of 4 to 20.

14. The method according to claim 10, wherein the carboxylic acid-containing compound is a monocarboxylic acid other than a straight chain fatty acid.

15. The method according to claim 10, wherein the carboxylic acid-containing compound is one selected from saturated carboxylic acids having a naphthene nucleus, aromatic carboxylic acid derivatives, and benzoic acid.

16. The method according to claim 10, wherein the carboxylic acid-containing compound is a dicarboxylic acid.

17. The method according to claim 10, wherein the carboxylic acid-containing compound is one selected from succinic acid, succinic acid derivatives, sarcosine derivatives, aromatic carboxylic acid derivatives, and oxidized waxes.

18. The method according to claim 10, wherein the carboxylic acid-containing compound is one selected from succinic acid, alkyl succinic acid, half esters of alkyl succinic acid, alkenyl succinic acid, half esters of alkenyl succinic acid, succinimide, sarcosine derivatives, phthalic acid, and oxides of wax or petrolatum.

* * * * *